United States Patent

Van Der Hulst

[11] Patent Number: 5,538,407
[45] Date of Patent: Jul. 23, 1996

[54] PROPORTIONER AND FLUID PROPORTIONING SYSTEM

[75] Inventor: Willem Van Der Hulst, Civato, Italy

[73] Assignee: Groeneveld Transport Efficiency B.V., Gorinchem, Netherlands

[21] Appl. No.: 186,120

[22] Filed: Jan. 25, 1994

[30] Foreign Application Priority Data

Jan. 26, 1993 [NL] Netherlands ............... 9300150

[51] Int. Cl.⁶ ............... F04B 17/00; F16N 27/00; F16N 13/22
[52] U.S. Cl. ............... 417/401; 417/490; 184/29; 184/40; 184/105.2; 222/253; 222/263
[58] Field of Search ............... 222/249, 252, 222/253, 263; 184/7.4, 29, 40, 54, 105.2, 27.1; 417/392, 490, 495, 401

[56] References Cited

U.S. PATENT DOCUMENTS

| | | | |
|---|---|---|---|
| 1,616,773 | 2/1927 | Warren | 417/401 |
| 2,080,809 | 5/1937 | Dinkel | 222/263 |
| 2,738,902 | 3/1956 | Le Clair | 222/253 |
| 2,805,797 | 9/1957 | Neuman | 222/253 |
| 2,996,147 | 8/1961 | Callahan . | |
| 3,131,639 | 5/1964 | Huigens | 417/392 |
| 3,713,755 | 1/1973 | Scheffer | 417/392 |
| 3,945,772 | 3/1976 | Van de Moortele | 417/495 |
| 4,483,665 | 11/1984 | Hauser | 417/401 |

FOREIGN PATENT DOCUMENTS

| | | | |
|---|---|---|---|
| 0295701 | 12/1988 | European Pat. Off. | 184/105.2 |
| 852681 | 2/1940 | France . | |
| 610602 | 10/1948 | United Kingdom . | |
| WO92/03684 | 3/1992 | WIPO . | |

*Primary Examiner*—Richard A. Berisch
*Assistant Examiner*—William Wicker
*Attorney, Agent, or Firm*—Young & Thompson

[57] ABSTRACT

Fluid proportions system for proportioning a fluid intermittently at various places. This fluid comes from a storage point and is added by an intermittently operating pump to a proportioner, which feeds a fixed volume of fluid to an outlet more or less independently of the pressure. For returning the reciprocating piston present in the proportioner, use is made of a further fluid which is connected to the proportioner by a further inlet line. A forced return movement of the piston is thereby achieved. Proportioning of fluid is realized by the proportioning fluid itself while return movement in the proportioner of the piston is realized by the control fluid.

4 Claims, 3 Drawing Sheets

5,538,407

PROPORTIONER AND FLUID PROPORTIONING SYSTEM

BACKGROUND OF THE INVENTION

1. Field of the Invention

The invention relates to a proportioner as well as a fluid proportioning system.

2. Description of the Related Art

In FR-A-852,681 a two conduit proportioning system is described in which one conduit acts to effect the pump stroke of the proportioner whilst the other conduit carries the fluid to be proportioned and also acts to control the return movement of the piston in the proportioner.

According to a specific embodiment of this French patent specification the fluids used in both conduits can be the same. This means that the fluid which effects compression can be the same kind of grease as the fluid which is used for greasing. The fluid for the working stroke of the piston is not refreshed and subjected to severe loading. If this fluid is oil there is no problem, but if one aims to use the same fluid, i.e. grease for both conduits, deterioration of the grease may result. Finally grease will decompose into seep.

In the prior art, fluid proportioning systems are used where a constant quantity of fluid has to be dispensed in a centrally controlled manner at quite a large number of places, always to some extent independently of the feed pressure. One example of this is grease lubricating systems of the type used in vehicles. It is important here that a quantity of grease should always be fed to a different number of bearing points after a certain time, or after, for example, a number of brake applications. A greater or smaller quantity of grease may be required, depending on the bearing. For such accurate proportioning, use is made of proportioners in which a piston moves to and fro. The volume displaced by such a piston determines the quantity of proportioned grease. Such a piston is moved in one direction through the build-up of pressure, and the return movement is achieved by means of a spring. With such a system it is possible to grease a large number or a small number of lubrication points by means of one system. This is important in particular in body-building, because with a single universal system, various vehicles can be provided with a different number of lubrication points. In recent years attempts have been made to use ever thicker lubricating grease. The advantage of this is that it runs out of the bearing less quickly, and it seals the bearing better relative to the environment, with the result that a lower grease consumption can be achieved. Apart from the cost aspect, environmental considerations play an important role. In the case of the currently used lubricating systems so-called "0-grease" or the more free-flowing "00-grease" are used, while efforts are being made to use 1-grease or 2-grease. If such a thick grease is used, problems occur through the fact that the return of the piston to the proportioner housing under the influence of the spring used is no longer guaranteed. As soon as this return can no longer be guaranteed, lubrication at the next stroke can no longer be guaranteed either. In the case of thick grease, problems occur in particular where there are long and/or thin lines, and at a lower temperature. A solution proposed in the prior art is to operate the various proportioners in succession. For this purpose, a complex system which controls the operation in succession of said proportioners is necessary. Working with a ring line has also been proposed. All such systems are satisfactory in certain applications, but it is not possible to extend or reduce such a system in a flexible way.

SUMMARY OF THE INVENTION

The invention aims to provide a proportioner wherein the grease or other fluid in the control part is not subjected to such considerable shear forces as in the art wherein this control fluid has to provide the pressure to displace the fluid to be proportioned.

The invention is based on the idea that the fluid to be proportioned also acts to effect the working stroke of the piston to expel the fluid to be proportioned from the proportioner. The control fluid only acts to control valve means, to block the passage from the conduit providing fluid to be proportioned to the outlet of the proportioner and to effect the return movement of the piston. Both steps require relatively low pressure and prevent seeping of the grease and subsequently blockage of the proportioner to occur.

Since, unlike the prior art, the return means are not longer formed by a spring, but according to a special embodiment of the invention, the piston is returned by a fluid, the proportioner—and more particularly the piston—is provided with a further contact face which is connected to a further inlet. This means that the piston can be driven back by the fluid after proportioning. A further contact face can be achieved by all ways known in the prior art, and a particularly simple embodiment is characterized in that the piston is made stepped, and fluid can be introduced near the staggered part in order to drive back the piston. According to a further advantageous embodiment of such a proportioned, provision is made for a plunger in which one side can be placed under the influence of the inlet and the other side under the influence of the further inlet. Said plunger is used for moving fluid coming from the inlet towards the outlet. This is preferably effected through the piston and the stationary wall part of the housing interacting to form valve means, designed in such a way that, at the end of the stroke of the piston, a connection is achieved between the inlet and one side of the plunger, in the direction in which the fluid is pressed out through the outlet.

Although it is possible to accommodate the plunger in any way known in the part art in the housing of the proportioned, a particularly compact construction is obtained if the piston is accommodated in a sleeve, and the plunger is accommodated in an annular part between the sleeve and the housing. Of course, the various parts mentioned here are sealed relative to each other, for instance with O-rings.

To refresh the fluid provided in both conduits as much as possible according to the invention, a fluid proportioned system is provided. This means that only in the proportioners themselves the same control fluid will move to-and-fro. However, if the volume of the related chambers in the proportioned is relatively large with regard to the volume of the connecting conduits also the control fluid in the proportioner will substantially be refreshed. In this way seepage of the grease is substantially prevented.

It is possible here, on the one hand, to control the proportioning phase and, on the other hand, to control the return by means of the same fluid pump. Operation of one or the other line can be achieved by all means known in the prior art, but it is preferable to use a diverter valve which is controlled by a control system.

According to a further advantageous embodiment, the return and proportioning steps are achieved in the same time and in otherwise the same circumstances. With such a construction it is possible to make no distinction between the two lines to be used for each proportioner, which makes fitting extremely simple. This is further assisted by the fact that the inlet connections of the two lines are made the same.

BRIEF DESCRIPTION OF THE DRAWINGS

The invention will be explained in greater detail below with reference to an example of an embodiment, in which.

DETAILED DESCRIPTION OF THE PREFERRED EMBODIMENT

Figure 1A:
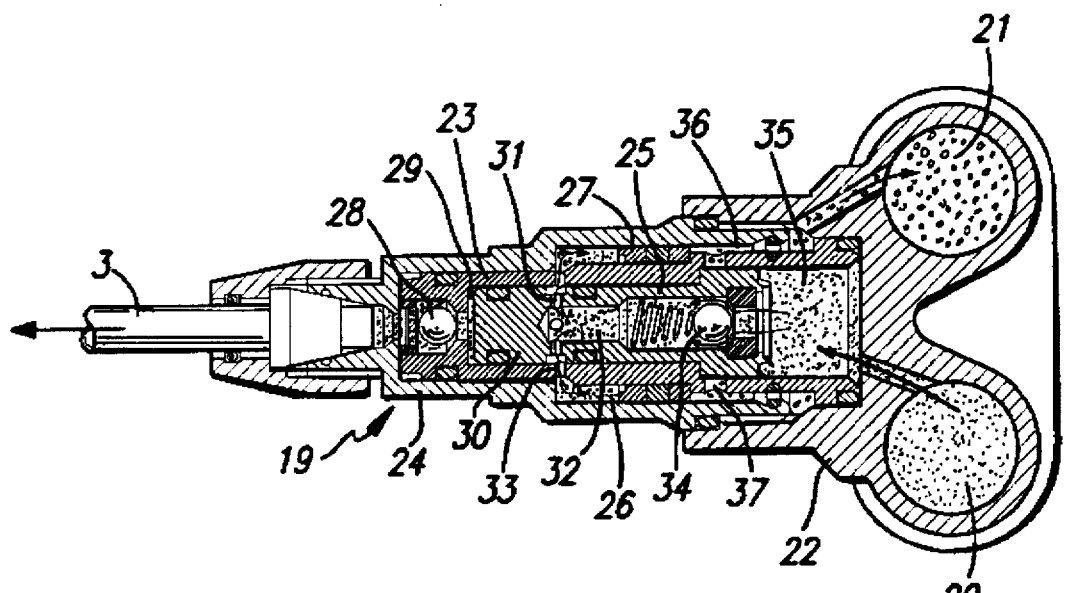
FIGS. 1a–1d show in cross-section a device according to the invention in various positions.

The proportioner 19 shown in FIGS. 1a–1d has two inlets 20 and 21 placed alternately under pressure. The outlet line can be connected in the same way as in the prior art to a part to be lubricated. The outlet line 3 is therefore also indicated. The housing 22 of the proportioner shown in FIG. 1 in which the inlets 20 and 21 are situated. Inlet 20 is an inlet for proportioning fluid whilst inlet 21 is the control fluid connection. A sleeve 23 is confined in a sealing manner therein by screw cap 24. A piston 25 can be moved to and fro within sleeve 23, while a plunger 27 is movable to and fro in a chamber 26 bounded between sleeve 23 and screw cap 24. Sleeve 23 is provided with a nonreturn valve 28 at the outlet end. Said valve 28 is in communication with chamber 29, which is bounded within the sleeve 23 before piston head 30. Behind piston head 30, there is a channel 31, which at one side is placed in communication with a bore 32 inside piston 25 and at the other side, through displacement of the piston 25, can be placed in communication with a channel 33 which is connected to chamber 26. A nonreturn valve 34, consisting of a spring-laded ball acting upon a seat, is accommodated in bore 32 of piston 25. Said valve 34 blocks the connection to a chamber 35, which is in turn connected to inlet 20. Inlet 21 is connected to a channel 36 bounded between the sleeve 23 and the screw cap 24. Said channel 36 opens out at one side onto a side of plunger 27 and at the other side into a transverse bore 37 in sleeve 23. The bore 37 opens onto a part of the sleeve 23 with an enlarged bore in which a part of piston 25 with an enlarged diameter moves.

The proportioned 19 shown in FIG. 1 works as follows:

Starting from the position in FIG. 1a, pressure is exerted on inlet 20, as shown by the arrows near the inlets 20 and 21, while it is possible for pressure to be released through inlet 21. This will be explained in greater detail below with reference to FIG. 2.

When grease pressure is applied for some time through line 20, piston 25 will be moved to the left, so that channel 31 lies opposite channel 33, with the result that grease can pass through nonreturn valve 34 and bore 32 into chamber 26, and plunger 27 can move to the right into the position shown in FIG. 1a.

Figure 1B:
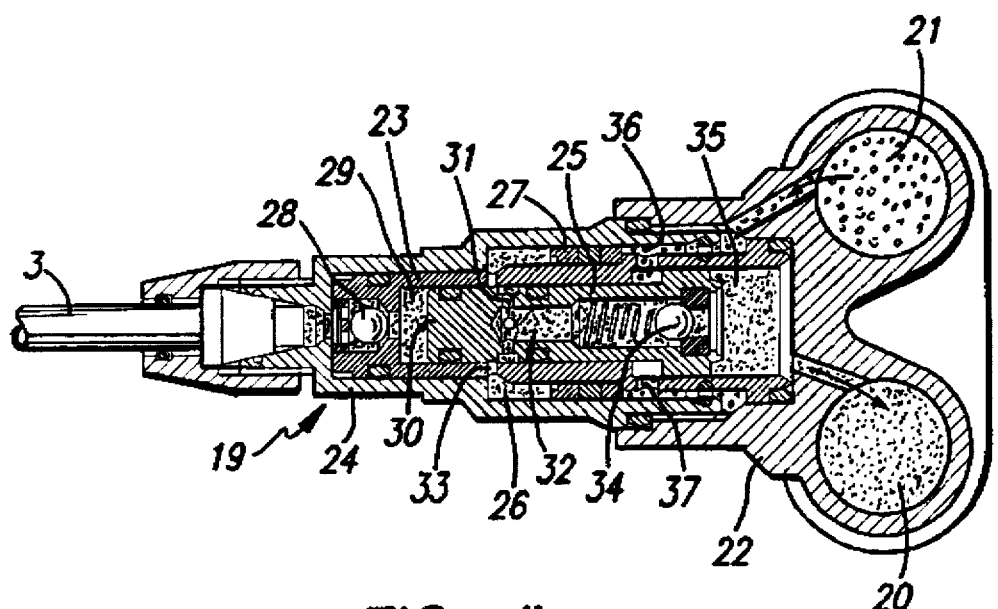
Figure 1C:
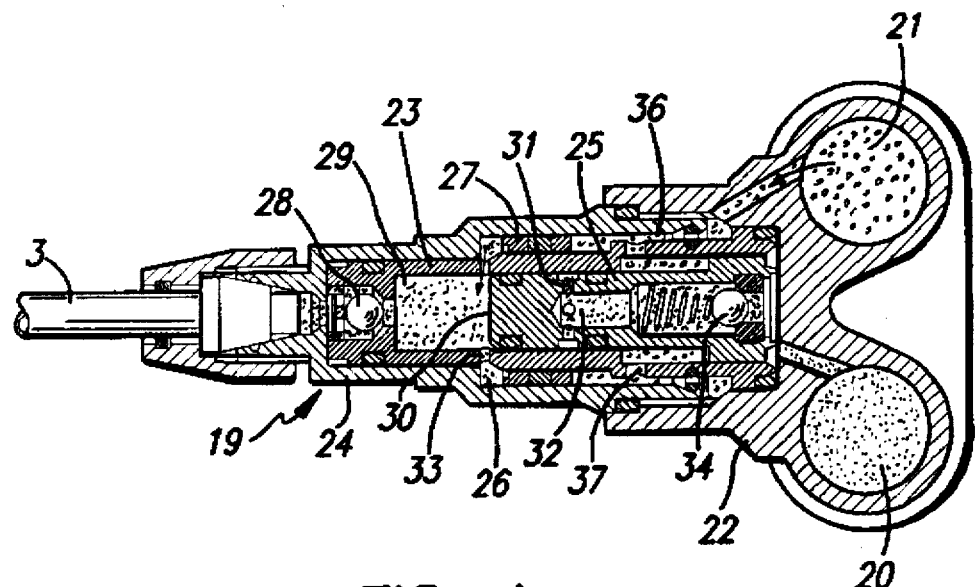
Figure 1D:
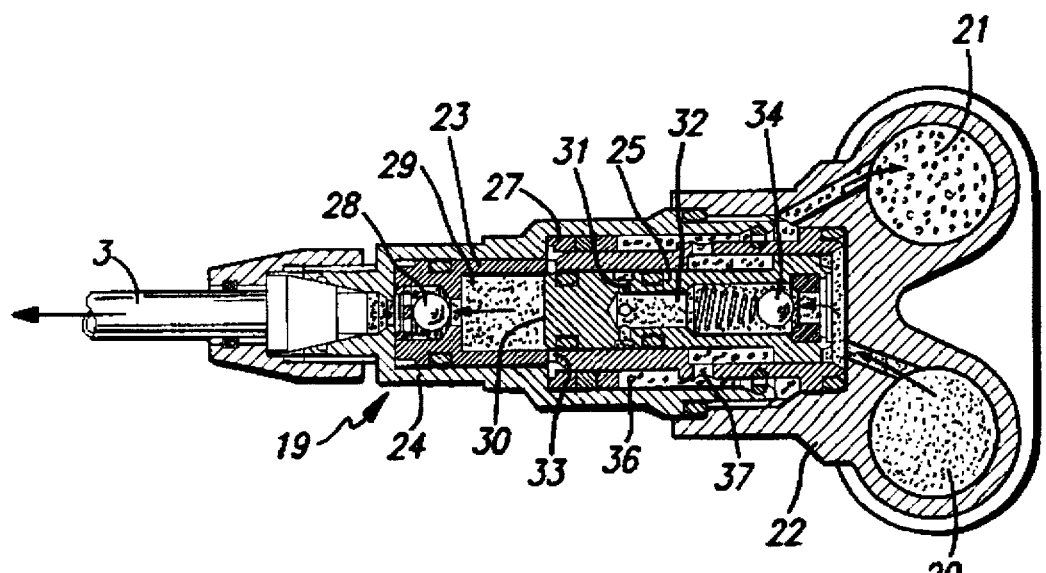

If, starting from this position, shown in FIG. 1a, pressure is exerted on inlet 21, and pressure can be released through line 20, the grease will flow out of inlet 21 through channel 36 and, on the one hand, place plunger 27 under pressure and, on the other hand, via transverse channel 37, exert pressure on the stepped part of piston 25, which under the influence thereof moves slightly to the right, as shown in FIG. 1b. This causes channel 33 to be shut off. As a result, plunger 27, will hardly be able to move to the left, due to the grease confined in chamber 26. The piston 25 then moves further to the right, as shown in FIG. 1c. Channel 33 is released here by piston head 30, with the result that plunger 27 can move to the left, as shown, driving the grease ahead of it and filling chamber 29. The pressure on line 21 is then removed, and pressure is applied to line 20, while line 21 can serve to release pressure if necessary. In other words, as already indicated, piston 25 moves to the left, and the grease in chamber 29 is driven in front of it through the nonreturn valve 28 into line 3, and the actual lubrication is carried out. During this movement of piston 25 to the left, channel 31 is moved in front of channel 33, so that pressure can be built up at the left side of plunger 27, which then moves to the right, as shown in FIG. 1a.

Through use of the two-line system it is not possible to control the to and fro movement of piston 25 completely positively. The quantity of grease which has to be pumped can be controlled by the height of plunger 27.

In general, if a lubrication pulse is necessary, pressure will be exerted on each of the pipes for a specific period. This means that the way in which the supply lines are connected is not important. For, in both cases grease will be pumped out of chamber 29 into line 3 either during the first pressure build-up or during the second pressure build-up, and the part in question will be lubricated.

Figure 2:
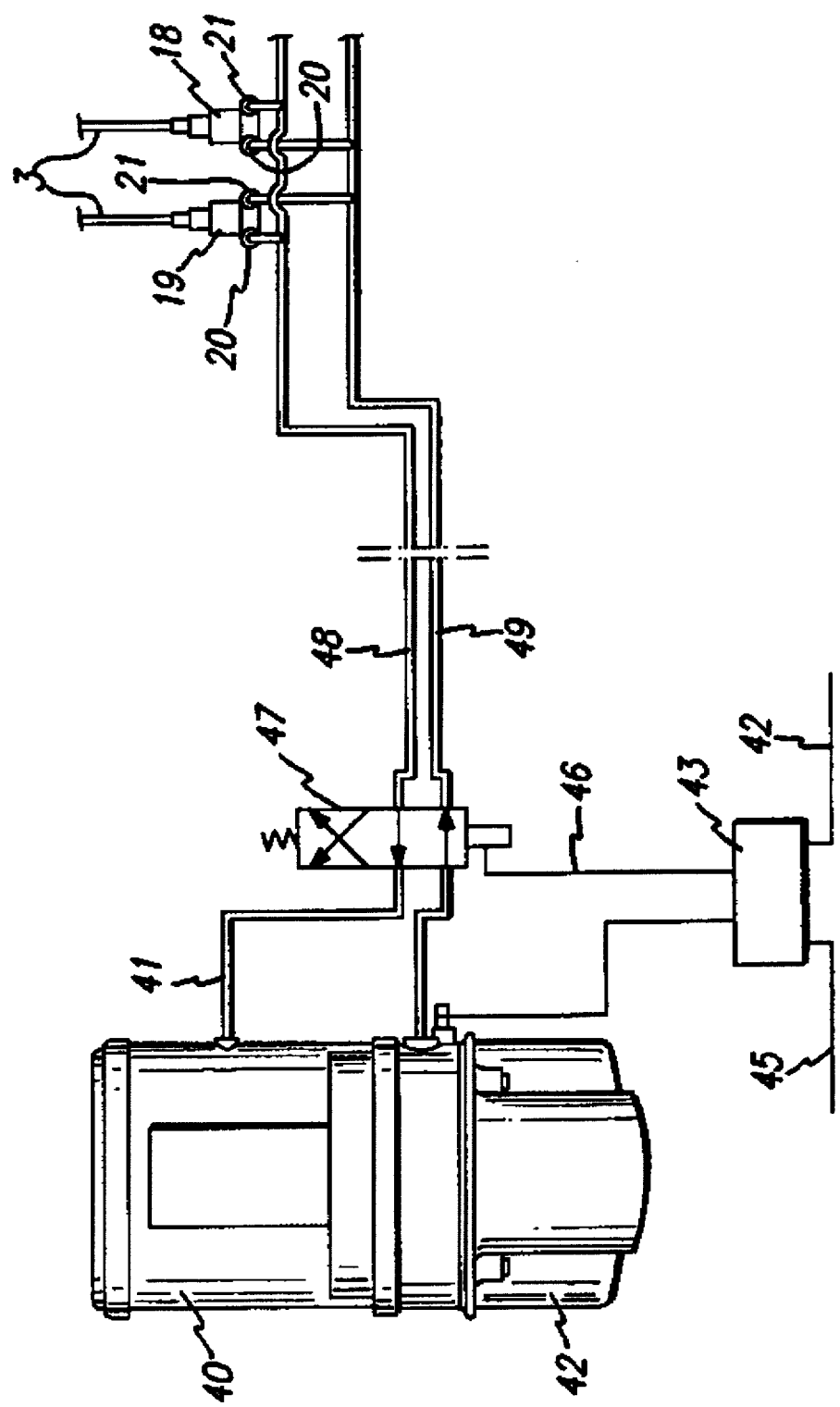
FIG. 2 shows diagrammatically the connection of the device shown in FIG. 1 to a grease lubricating system.

FIG. 2 shows diagrammatically the layout of a lubrication system. This system consists of a tank 40 containing grease, into which a discharge line 41 opens. Tank 40 contains a pump 42, which is controlled by a control system 43, depending on input signals coming from lines 44 and 45. These signals can comprise, for example, a time circuit or in the case of motor vehicles a circuit which becomes active after a certain number of brake applications. A diverter valve 47 is connected to control system 43 by a line 46. Lines 48 and 49 extend from diverter valve 47. By means of diverter valve 47, in a first position, line 48 is connected to pump 42 and line 49 is connected to discharge line 41. In a second position, line 48 is connected to discharge line 41, and line 49 is connected to pump 42. During intermittent operation of pump 42, pressure is exerted in this way on line 48 for a first period and on line 49 for a second period. In this case line 48 is connected to inlet 21 of the proportioner, and line 49 is connected to inlet 20 of the proportioner. It is clearly indicated that various proportioners can be connected in series.

From FIG. 2 it is clear that conduit 48 is connected on the one hand with the inlet 20 for fluid to be proportioned out of proportioner 19 and on the other hand with inlet 21 for control fluid of proportioner 18. This means that there is always a substantial flow of fluid through both lines 48 and 49 preventing seepage or other deterioration of the grease transported through these conduits to occur. Other proportioners can be connected in the same alternating way. This makes it possible, irrespective of the type of grease used or the size of the lines, always to ensure that a predetermined quantity of grease is supplied to each point, and it is possible to extend of reduce the system as desired, without this having an effect on the operating proportioners.

Although the invention is described above with reference to a preferred embodiment, it must be understood that numerous modifications can be made thereto without going beyond the scope of the present invention. For example, it is possible in principle to convey two different fluids through the lines. For example, the grease is supplied only through line 20 to chamber 26, and it is this grease which is moved later by plunger 27 to chamber 29, and thus line 3. This makes it possible to use another fluid in line 21. Of source, this "control fluid" must be resistant to change. The principle of the invention is so widely applicable that the return movement of piston 25 can also be effected in a difference forced and controlled manner by a signal transmitted by a line corresponding to line 21. All these embodiments lie within the scope of the claims which follow.

I claim:

1. Proportioner to be used in a fluid proportioning system having two conduits, comprising:

a housing provided with a first inlet for fluid to be proportioned;

a second inlet for control fluid;

a chamber formed by the housing connected with the first inlet and with an outlet for the fluid to be proportioned;

a piston means, arranged in the chamber, for proportioning the fluid through said piston means; and valve means, controlled by the control fluid, for blocking a connection between the first inlet and the chamber;

wherein the first inlet opens at a side of the chamber remote from the piston means;

wherein the second inlet opens at another side of the chamber adjacent to the piston means; and wherein the valve means includes a plunger, one side of which can be placed under the influence of the first inlet for the fluid to be proportioned, while an opposite side of which can be brought under the influence of the second inlet for the control fluid.

2. Proportioner according to claim 1, wherein the piston means includes a stepped geometry having a stepped part, said stepped part having a step face fluidly connected with the second inlet for the control fluid.

3. Proportioner according to claim 1, wherein the piston means and a stationary wall part of the housing interact to form said valve means which is designed in such a way that, at one end of a stroke of the piston means, a connection is achieved between the first inlet for the fluid to be proportioned and one side of the plunger, said stroke pressing fluid through the outlet.

4. Proportioner according to claim 1, wherein the piston means is accommodated in a sleeve and the plunger is accommodated in an annular part between the sleeve and the housing.

* * * * *